(12) United States Patent
Kwon et al.

(10) Patent No.: US 11,334,767 B2
(45) Date of Patent: May 17, 2022

(54) SYSTEM AND METHOD OF PERCEPTION ERROR EVALUATION AND CORRECTION BY SOLVING OPTIMIZATION PROBLEMS UNDER THE PROBABILISTIC SIGNAL TEMPORAL LOGIC BASED CONSTRAINTS

(71) Applicant: HRL Laboratories, LLC, Malibu, CA (US)

(72) Inventors: Hyukseong Kwon, Thousand Oaks, CA (US); Amir M. Rahimi, Santa Monica, CA (US); Amit Agarwal, Monterey Park, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 17/030,354

(22) Filed: Sep. 23, 2020

(65) Prior Publication Data

US 2021/0089837 A1    Mar. 25, 2021

Related U.S. Application Data

(60) Provisional application No. 62/984,713, filed on Mar. 3, 2020, provisional application No. 62/905,059, filed on Sep. 24, 2019.

(51) Int. Cl.
*G06K 9/62* (2022.01)
*G06N 3/08* (2006.01)
(Continued)

(52) U.S. Cl.
CPC .............. *G06K 9/6265* (2013.01); *G06N 3/08* (2013.01); *G06V 10/22* (2022.01);
(Continued)

(58) Field of Classification Search
CPC .... G06K 9/00624; G06K 9/03; G06K 9/2054; G06K 9/52; G06K 9/6265;
(Continued)

(56) References Cited

U.S. PATENT DOCUMENTS

| 8,027,946 B1* | 9/2011 | Daily | G06F 11/2257 |
|---|---|---|---|
| | | | 706/47 |
| 9,008,840 B1* | 4/2015 | Ponulak | G06N 3/049 |
| | | | 700/250 |

(Continued)

OTHER PUBLICATIONS

A. Dokhanchi, H.B. Amor, J.V. Deshmukh, and G. Fainekos, "Evaluating perception systems for autonomous vehicles using quality temporal logic," International Conference on Runtime Verification, 2018, pp. 1-7.

(Continued)

*Primary Examiner* — Peet Dhillon
(74) *Attorney, Agent, or Firm* — Tope-McKay and Associates

(57) ABSTRACT

Described is a system to evaluate and reduce perception error in object detection and recognition. The system includes a perception module that receives perception data (of an object(s)) from an environment proximate a mobile platform. Perception probes are generated that describe one or more characteristics of the objects. The perception probes are converted into probabilistic signal temporal logic (PSTL)-based constraints that provide axioms having statistical analysis of the perception probes. The axioms are evaluated to classify the perception probes as valid or erroneous. Optimal perception parameters are generated by solving an optimization problem based on the axioms, which allows the system to adjust the perception module based on the optimal perception parameters.

18 Claims, 9 Drawing Sheets

(51) Int. Cl.
  *G06V 10/22* (2022.01)
  *H04N 5/232* (2006.01)
(52) U.S. Cl.
  CPC ..... *H04N 5/23218* (2018.08); *H04N 5/23296* (2013.01); *H04N 5/232127* (2018.08)
(58) Field of Classification Search
  CPC ......... G06K 9/00791; H04N 5/232127; H04N 5/23218; H04N 5/23296; G06N 3/08
  See application file for complete search history.

(56) References Cited

U.S. PATENT DOCUMENTS

| | | | | |
|---|---|---|---|---|
| 9,626,591 | B2 | 4/2017 | Holz et al. | |
| 10,699,419 | B2* | 6/2020 | Cui | G05B 19/4183 |
| 2011/0051992 | A1* | 3/2011 | Cobb | G06K 9/00986 382/100 |
| 2012/0188365 | A1* | 7/2012 | Stork | B23K 26/046 348/90 |
| 2015/0378696 | A1* | 12/2015 | Boehm | G06F 8/45 717/149 |
| 2016/0165193 | A1* | 6/2016 | Rasheed | H04N 7/188 348/143 |
| 2017/0364831 | A1* | 12/2017 | Ghosh | G06N 7/005 |
| 2018/0005118 | A1* | 1/2018 | Kapoor | G06F 21/50 |
| 2020/0036743 | A1* | 1/2020 | Almukaynizi | G06N 5/048 |
| 2020/0111005 | A1* | 4/2020 | Ghosh | G06N 3/0454 |
| 2020/0111012 | A1* | 4/2020 | Wan | G06N 5/022 |
| 2021/0011461 | A1* | 1/2021 | Fowler | G06N 5/04 |
| 2021/0081751 | A1* | 3/2021 | Boss | G06N 3/008 |

OTHER PUBLICATIONS

R.R. da Silva, V. Kurtz, and M. Hebert, "Active Perception and Control from Temporal Logic Specifications," arXiv:1905.03662, 2019, pp. 1-6.
S. Jha, V. Raman, D. Sadigh, and S.A. Seshia, "Safe Autonomy Under Perception Uncertainty Using Chance-Constrained Temporal Logic," Journal of Automated Reasoning, 2018, pp. 43-62.
D. Sadigh and A. Kapoor, "Safe control under uncertainty with Probabilistic Signal Temporal Logic," in Proc. Of Robotics: Science and Systems, 2016, pp. 1-10.
Joseph Redmon, Santosh Divvala, Ross Girshick, Ali Farhadi; The IEEE Conference on Computer Vision and Pattern Recognition (CVPR), 2016, pp. 779-788.
N. Wojke, A. Bewley and D. Paulus, "Simple online and realtime tracking with a deep association metric," 2017 IEEE International Conference on Image Processing (ICIP), Beijing, 2017, pp. 3645-3649.
YOLO: Real-Time Object Detection, https://pjreddie.com/darknet/yolo/ , downloaded Dec. 15, 2020.
Notification of Transmittal and the International Search Report, and the Written Opinion of the International Searching Authority for PCT/US2020/052342; dated Feb. 2, 2021.
Yulong Wu, et al., "Active Control of Camera Parameters for Object Detection Algorithms", arxiv.org, Cornell University Library, 201. Olin Library Cornell Uni Versity Ithaca, NY, 14853, May 16, 2017 (May 16, 2017), XP080948249.
Balakrishnan Anand, et al., "Specifying and Evaluating Quality Metrics for Vision-based Perception Systems", 2019 Design, Automation & Test in Europe Conference & Exhibition (Date), EDAA, Mar. 25, 2019 (Mar. 25, 2019), pp. 1433-1438, XP033550188.
Tuncali Cumhur Erkan, et al., "Simulation-based Adversarial Test Generation for Autonomous Vehicles with Machine Learning Components", 2018 IEEE Intelligent Vehicles Symposium (IV), IEEE, Jun. 26, 2018 (Jun. 26, 2018), pp. 1555-1562, XP033423320.
A. Dokhanchi, H.B. Amor, J.V. Deshmukh, and G. Fainekos, "Evaluating perception systems for autonomous vehicles using quality temporal logic," International Conference on Runtime Verification, pp. 409-416, 2018.

R.R. da Silva, V. Kurtz, and M. Hebert, "Active Perception and Control from Temporal Logic Specifications," arXiv:1905.03662, pp. 1-6, 2019.
S. Jha, V. Raman, D. Sadigh, and S.A. Seshia, "Safe Autonomy Under Perception Uncertainty Using Chance-Constrained Temporal Logic," Journal of Automated Reasoning, pp. 43-62, 2018.
D. Sadigh and A. Kapoor, "Safe control under uncertainty with Probabilistic Signal Temporal Logic," in Proc. Of Robotics: Science and Systems, pp. 1-10, 2016.
J. A. Stark, "Adaptive Image Contrast Enhancement Using Generalizations of Histogram Equalization," IEEE Transactions on Image Processing, vol. 9, No. 5, pp. 889-896, 2000.
V. Vonikakis, D. Chrysostomou, R. Kouskouridas and A. Gasteratos, "Improving the Robustness in Feature Detection by Local Contrast Enhancement," 2012 IEEE International Conference on Image Systems and Techniques Proceedings, pp. 1-6, Jul. 2012.
YOLO Real Time Object Detection, located at pjreddie.com/darknet/yolo/, pp. 1-7, taken on Aug. 12, 2020.
Luminance Contrast, found at colorusage .arc. nasa .gov/luminance_cont.php, pp. 1-7, taken on Dec. 2, 2020.
Multiple Object Tracking Benchmark, located at motchallenge.net, pp. 1-3, taken on Aug. 12, 2020.
Information Entropy Measure for Evaluation of Image Quality, Du-Yih Tsai, Yongbum Lee, Eri Matsuyama, J Digit Imaging. Sep. 2008; 21(3): pp. 338-347. Published online Jun. 19, 2007. doi: 10.1007/s10278-007-9044-5.
Notification of Transmittal and the International Search Report, and the Written Opinion of the International Searching Authority for PCT/US2020/042431; dated Oct. 9, 2020.
Lillo Ivan, et al: "A Hierarchical Pose-Based Approach to Complex Action Understanding Using Dictionaries of Actionlets and Motion Poselets", 2016 IEEE Conference on Computer Vision and Pattern Recognition (CVPR), IEEE, Jun. 27, 2016 (Jun. 27, 2016), pp. 1981-1990, XP033021376.
Zhu Guangming, et al: "Human action recognition using key poses and atomic motions", 2015 IEEE International Conference on Robotics and Biomimetics (ROBIO), IEEE, Dec. 6, 2015 (Dec. 6, 2015), pp. 1209-1214, XP032873270.
Sung, Jaeyong, et al. "Unstructured human activity detection from RGBD images." Robotics and Automation (ICRA), 2012 IEEE International Conference on. IEEE, 2012, pp. 842-849.
Shu, Liangcai, et al. "Kernel-based transductive learning with nearest neighbors." Advances in Data and Web Management. Springer, Berlin, Heidelberg, 2009, pp. 345-356.
Deutsch, Shay, et al. "Zero shot learning via multi-scale manifold regularization." The IEEE Conference on Computer Vision and Pattern Recognition (CVPR), 2017, pp. 5292-5299.
Ofli, Ferda, et al. "Sequence of the most informative joints (SMIJ): A new representation for human skeletal action recognition." Journal of Visual Communication and Image Representation 25.1, 2014, pp. 24-38.
Wang, Jiang, et al. "Mining actionlet ensemble for action recognition with depth cameras." Computer Vision and Pattern Recognition (CVPR), IEEE Conference on. IEEE, 2012, pp. 1290-1297.
Xian, Yongqin, Bernt Schiele, and Zeynep Akata. "Zero-shot learning-the good, the bad and the ugly." arXiv preprint arXiv:1703.04394, 2017, pp. 1-10.
Evangelidis, Georgios, Gurkirt Singh, and Radu Horaud. "Skeletal quads: Human action recognition using joint quadruples." Pattern Recognition (ICPR), 2014 22nd International Conference on. IEEE, 2014, pp. 4513-4518.
Xia, Lu, Chia-Chih Chen, and Jake K. Aggarwal. "View invariant human action recognition using histograms of 3D joints." Computer vision and pattern recognition workshops (CVPRW), 2012 IEEE computer society conference on. IEEE, 2012, pp. 20-27.
Yang, Xiaodong, and YingLi Tian. "Effective 3d action recognition using eigenjoints." Journal of Visual Communication and Image Representation 25.1, 2014, pp. 2-11.
Noroozi, Mehdi, et al. "Boosting Self-Supervised Learning via Knowledge Transfer." arXiv preprint arXiv:1805.00385, 2018, pp. 1-9.

(56) References Cited

OTHER PUBLICATIONS

Cao, Zhe, et al. "Realtime multi-person 2D pose estimation using part affinity fields." Proceedings of the IEEE Conference on Computer Vision and Pattern Recognition, 2017, pp. 1302-1310.

Kolouri et al. "Sliced-wasserstein autoencoder: An embarrassingly simple generative model." arXiv preprint arXiv:1804.01947, 2018, pp. 1-25.

* cited by examiner

SYSTEM AND METHOD OF PERCEPTION ERROR EVALUATION AND CORRECTION BY SOLVING OPTIMIZATION PROBLEMS UNDER THE PROBABILISTIC SIGNAL TEMPORAL LOGIC BASED CONSTRAINTS

CROSS-REFERENCE TO RELATED APPLICATIONS

This application claims the benefit of and is a non-provisional patent application of U.S. Provisional Application No. 62/905,059, filed on Sep. 24, 2019, the entirety of which is hereby incorporated by reference.

This application ALSO claims the benefit of and is a non-provisional patent application of U.S. Provisional Application No. 62/984,713, filed on Mar. 3, 2020, the entirety of which is hereby incorporated by reference.

BACKGROUND OF INVENTION

(1) Field of Invention

The present invention relates to an object recognition system and, more specifically, to a system that operates to evaluate and reduce perception error in object detection and recognition.

(2) Description of Related Art

Object detection is a process by which a system receives environmental or perception data and attempts to detect and recognize objects within the environment. The detection and recognition process is referred to as perception. Although systems are designed to accurately perceive a scene, perception errors can occur. Such perception errors are undesirable and, in some circumstances, can lead to devastating consequences. While improvements have been made in the related field, perception errors are still a challenging issue. In autonomous driving or navigation systems, a great number of wrong detections and recognitions threaten the development of fully autonomous systems. A number of researchers have devoted efforts to describing perception errors and recovering systems from them, especially with formally verifying the systems using the temporal logic (see the List of Incorporated Literature References, Literature Reference Nos. 1-4). However, existing systems plan to control the autonomous systems themselves rather than fix the perception systems.

Thus, a continuing need exists for a system that moves beyond the prior art by improving the perception systems through a feedback control of perception parameters from perception error evaluation.

SUMMARY OF INVENTION

The present disclosure provides a system to evaluate and reduce perception error in object detection and recognition. In one aspect, the system comprises one or more processors and a memory. The memory is a non-transitory computer-readable medium having executable instructions encoded thereon, such that upon execution of the instructions, the one or more processors perform several operations, including: receiving, with a perception module, perception data from an environment proximate a mobile platform, the perception data reflecting one or more objects in the environment; generating perception probes from the perception data, the perception probes describing one or more characteristics of the one or more objects; converting the perception probes into probabilistic signal temporal logic (PSTL)-based constraints, the PSTL-based constraints providing axioms having statistical analysis of one or more perception probes; evaluating the axioms to classify the perception probes as valid or erroneous; generating optimal perception parameters by solving an optimization problem based on the axioms; and adjusting the perception module based on the optimal perception parameters.

In another aspect, adjusting the perception module includes causing a camera to initiate a physical action selected from a group consisting of changing a directional focus or altering a field-of-view.

In yet another aspect, generating perception probes from the perception data includes detecting one or more objects in the perception data, tracking the one or more objects, and recognizing an action of the one or more objects.

Further, in converting the perception probes into probabilistic signal temporal logic (PSTL)-based constraints, a probabilistic signal temporal logic for a probe f (x) is generated as follows:

$$\forall x, Pr(a \leq f(x, t_s : t_e) \leq b \rightarrow y) \geq P_{TP},$$

where Pr(•) is a predicate and y is a true detection or recognition, where $P_{TP}$ denotes confidence probability of the probe, and where $t_s:t_e$ denotes a time sequence between $t_s$ and $t_e$, such that $f(x, t_s:t_e)$ is a probe sequence in time frame of $t_s:t_e$, and where a and b denote lower bound and the upper bound, respectively, of f( ) for statistical true positive distributions, and $\forall x$ means for every detection/recognition x.

In yet another aspect, the perception probes are classified as erroneous when the confidence probability is outside of the lower bound or upper bound.

Additionally, generating optimal perception parameters is determined by identifying an optimal control input $u_{OPT}$ that minimizes perception errors.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
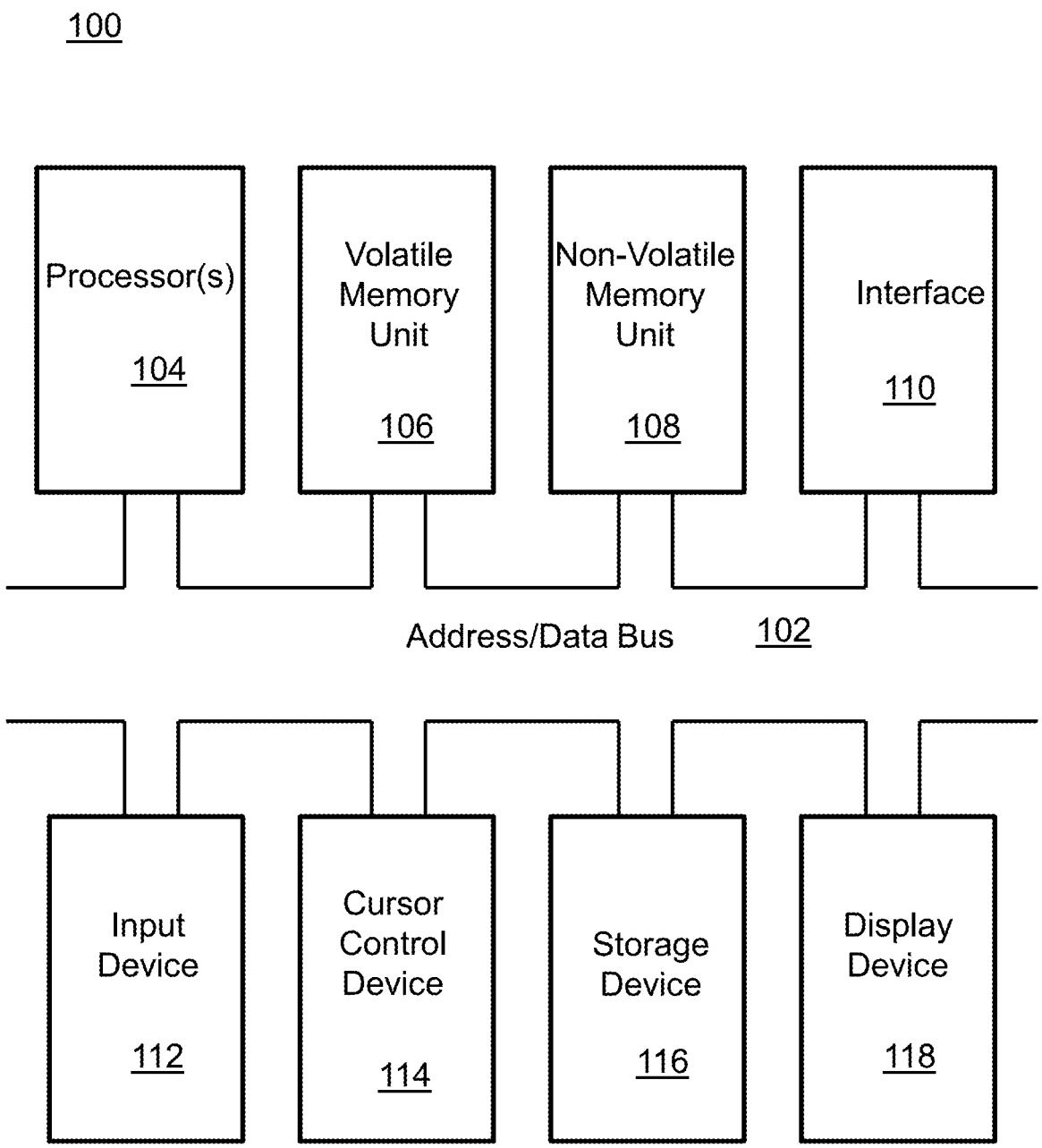
FIG. 1 is a block diagram depicting the components of a system according to various embodiments of the present invention.

The present invention relates to an object recognition system and, more specifically, to a system that operates to evaluate and reduce perception error in object detection and recognition. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a glossary of terms is provided, followed by a list of incorporated literature references. Next, a description of the various principal aspects of the present invention is provided. Subsequently, an introduction provides the reader with a general understanding of the present invention. Finally, specific details of various embodiment of the present invention are provided to give an understanding of the specific aspects.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

1. Autoencoder: A type of artificial neural network with an unsupervised learning technique. Some hidden layers have a small number of nodes for reducing the influence from signal noise.
2. Axiom: A proposition with a truth value (true or false).
3. Embedded Feature Space: A fixed-dimensional space from the original feature space. It provides more distinct distances between different types of features in the corresponding space, which is useful for classification.
4. Formal Verification: Providing correctness of the system (hardware or software) using formal methods in mathematics.
5. LSTM long short-term (LSTM) framework: A type of the recurrent neural network (RNN), which satisfies long term dependencies of keeping memories.
6. Part Affinity Fields: A set of vectors which represent the degree of association of parts (e.g. distances, angles, etc.).
7. Perception: Information from the sensor systems.
8. Perception Error: Wrong recognition of object IDs or types.
9. Perception Parameters: Perception system controlling parameters to acquire better detection or recognition.
10. Probe: Perception outputs describing the characteristics (size, color, type, etc.) of detected objects.
11. PSNR: Pixel-level signal-to-noise ratio in the image plane.
12. PSTL (probabilistic signal temporal logic): Rules and symbolism of representing reasoning in terms of time along with real-valued signal inputs and considering probabilistic occurrences.
13. Shared Latent Feature Space: A space which can make transformations between two different domains through the latent space manifold.
14. SSL (Self-Supervised Learning): A type of neural network which automatically generates supervisory signals during the pre-training phase, then uses it for the actual training phase.
15. Transductive Learning: Building a model that works for already observed training and testing data.
16. tKNN (Transductive K-Nearest Neighbor): A classification method using the kth nearest neighing classes, which is acquired through transductive learning.

(2) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. A. Dokhanchi, H. B. Amor, J. V. Deshmukh, and G. Fainekos, "Evaluating perception systems for autonomous vehicles using quality temporal logic," International Conference on Runtime Verification, 2018.
2. R. R. da Silva, V. Kurtz, and M. Hebert, "Active Perception and Control from Temporal Logic Specifications," arXiv:1905.03662, 2019.

3. S. Jha, V. Raman, D. Sadigh, and S. A. Seshia, "Safe Autonomy Under Perception Uncertainty Using Chance-Constrained Temporal Logic," Journal of Automated Reasoning, 2018.
4. D. Sadigh and A. Kapoor, "Safe control under uncertainty with Probabilistic Signal Temporal Logic," in Proc. Of Robotics: Science and Systems, 2016.
5. Joseph Redmon, Santosh Divvala, Ross Girshick, Ali Farhadi; The IEEE Conference on Computer Vision and Pattern Recognition (CVPR), 2016, pp. 779-788.
6. N. Wojke, A. Bewley and D. Paulus, "Simple online and realtime tracking with a deep association metric," 2017 IEEE International Conference on Image Processing (ICIP), Beijing, 2017, pp. 3645-3649.
7. U.S. patent application Ser. No. 16/931,420, entitled, "Learning Actions with Few Labels in the Embedded Space," by A. M. Rahimi, H. Kwon and H. Hoffmann.

(3) Principal Aspects

Various embodiments of the invention include three "principal" aspects. The first is a system for perception error evaluation and correction. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein.

Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
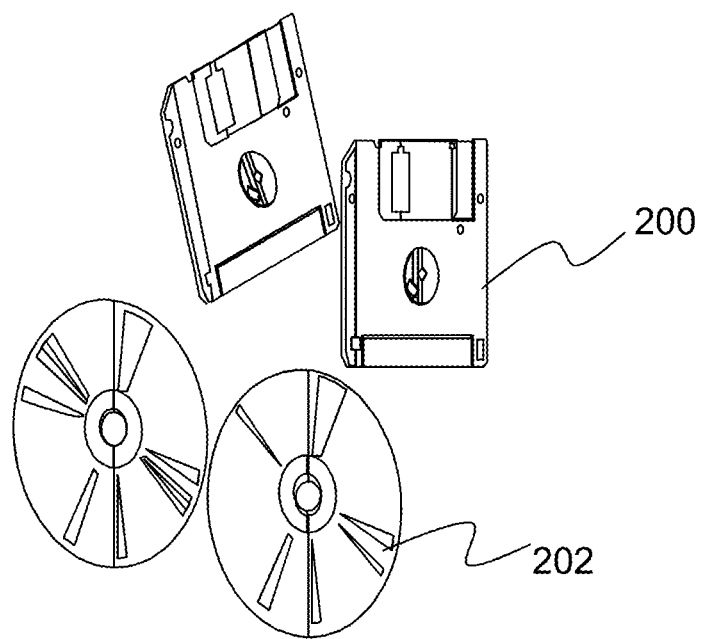
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(4) Introduction

The present disclosure provides a system and method to evaluate perception errors using detection, recognition and the corresponding information of objects.

The process then corrects perception errors by solving perception optimization problems. Using the characteristics of geometry, dynamics, and semantic information of the objects, the system implements probabilistic signal temporal logic and axioms with the developed logic components. By evaluating these axioms, the system can formally verify if the detections or recognitions are valid or erroneous. With the developed axioms, the probabilistic signal temporal logic-based constraints are developed, which are then used to solve the corresponding optimization problems to correct perception errors and obtain more accurate object recognition.

The system and method provide several unique improvements over the prior art. For example, the system is capable of converting perception probes into the probabilistic signal temporal logic for formally verifying errors. The system also provides for perception error evaluation and detection using axioms generated from the probabilistic signal temporal logic. Further, the system is operable for perception error correction by solving optimization problems with the axiom-generated constraints. As can be appreciated by those skilled in the art, there are several applications in which estimating and correcting perception errors with formal verification can be implemented. For example, the system can be used to provide for robust autonomous driving systems, in autonomous unmanned systems, and also in more reliable search and rescue missions.

In operation, the system uses perception modules to generate the perception data. The system ultimately evaluates the perception data to identify errors and optimizes the parameters of the perception modules to minimize perception error. As an example, the perception modules can be cameras outfitted on an autonomous vehicle. The perception data (e.g., camera feed) is the processed, which leads to control signals being sent to the cameras to reduce perception errors. For example, the brightness or field-of-view settings may be adjusted to modify the incoming perception data. As can be appreciated, other implementations are also possible. Further details are provided below.

(5) Specific Details of Various Embodiments

(5.1) Overview

Figure 3:
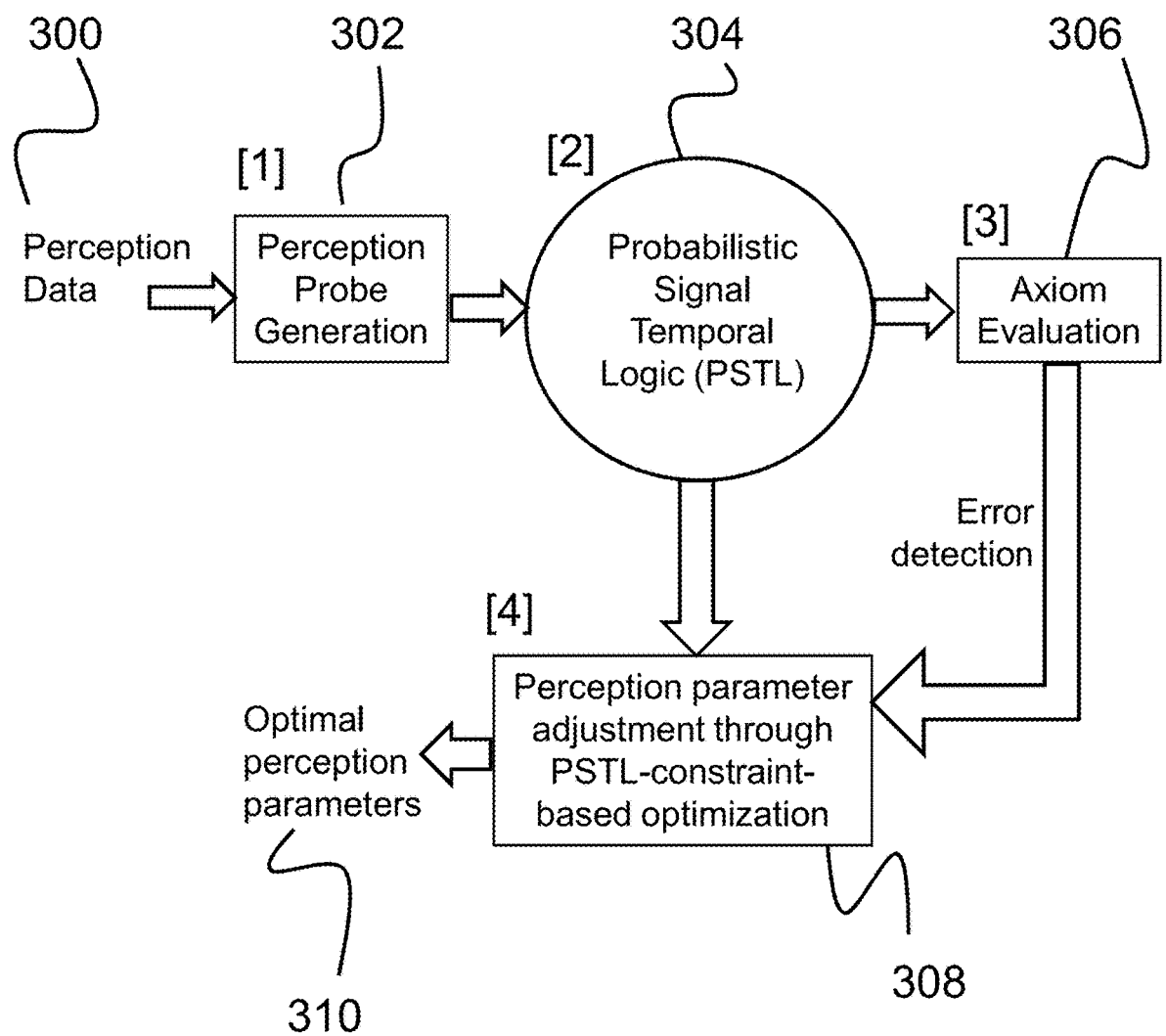
FIG. 3 is a flowchart depicting a process flow according to various aspects of the present invention.

The overall structure of the described process is shown in FIG. 3. The system uses perception modules to generate the perception data. First, from the perception data 300, the system generates probes 302 which describe characteristics of detections and recognitions, such as the size, type, tracking deviations, and so on. The probes 302 are any outputs of the sensor systems and are used for signal temporal logic. The perception data 300 is, for example, visual feature(s) received by a camera. Thus, in this non-limiting example, a camera sensor would be mounted on a car or vehicle. When a person or another vehicle is detected, those visual features of the other person or car would be the perception data.

Using the probes, the system generates 304 a 'probabilistic signal temporal logic' (PSTL) 304. In other words, the probes are converted into the PSTL based constraints using the statistically analyzed bounds. An example of such a PSTL can be found in Literature Reference No. 4. The PSTL provides axioms, each of which is constructed with single or multiple probes with the corresponding statistical analyses. As an intermediate process, the axioms are evaluated 306 to provide the error analysis on the detections/recognitions. Thus, axioms are generated using the constraints, and evaluated 306 for classifying the corresponding observations as valid or erroneous. Then, with those axiom-based constraints, the system solves an optimization problem 308 to synthesize controls (i.e., optimal perception parameters 310) for the perception modules in order to reduce perception errors. Thus, if the axioms are invalid within certain probabilities, the system estimates appropriate perception module parameters to apply by solving the corresponding optimization problems. These estimated parameters are delivered to adjust the perception module through a feedback process in order to guide to better perception. Perception modules are, for example, cameras, range sensors, LIDAR, motion sensors, etc. Parameter adjustments are, for example, detection confidences, tracking thresholds, contrast rations, directional pointing of the perception module (e.g., pointing or focusing a sensor), etc.

(5.2) Perception Probes Generation

Figure 4:
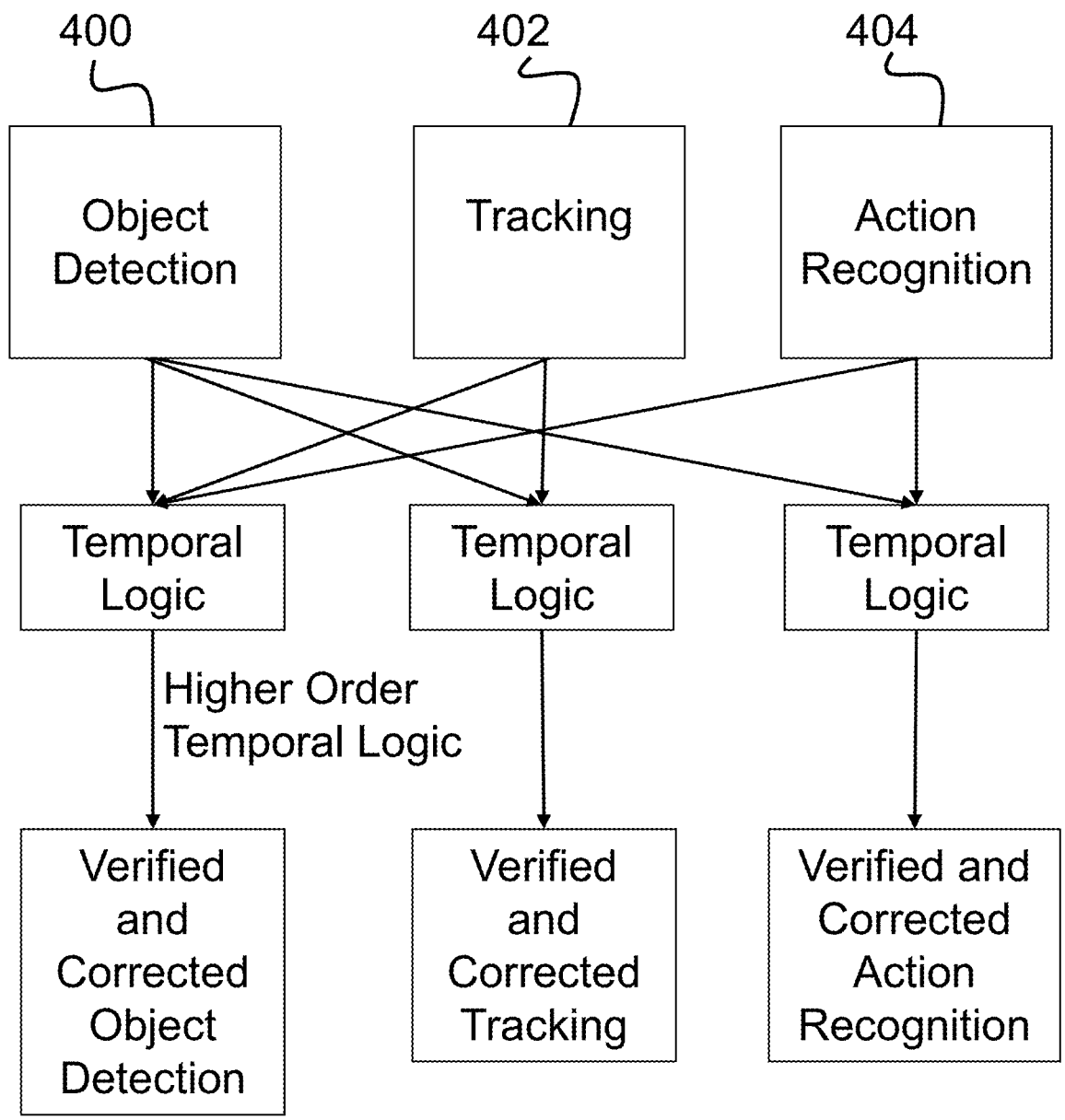
FIG. 4 is an illustration depicting a perception system for generating probes according to various aspects of the present invention.

As noted above, the first step in the process is to obtain the perception data along with characteristics of detections and recognitions. To get different types of probes (characteristics) efficiently, as shown in FIG. 4, the perception system includes three modules: (a) object detection 400; (b) tracking performance 402; and (c) action recognition 404.

Through the multiple modules, the system can generate various probes to describe the corresponding detection and recognition, effectively.

Any suitable technique known to those skilled in the art can be employed for each of the three modules referenced above. As non-limiting examples, several state-of-the-art techniques are used (e.g. YOLO3) for object detection 400 (see Literature Reference No. 5), SORT for tracking 402 (see Literature Reference No. 6), and a recurrent neural network (RNN) classifier for action recognition 404 (see Literature Reference No. 7). Following are several non-limiting examples of probes that can be generated:

1. Object size (in the image plane and in the world coordinate frame):
   i. Number of pixels of the detected object in width and height.
2. Aspect ratio of the detected objects:
   i. A ratio of the height over the width of the object in the image plane.
3. Semantic localization:
   i. Location information with relationship with other neighborhood objects (e.g. in front of the building).
4. Recognition confidence:
   i. Confidence score of recognition though the deep learning based computer vision process.
5. Tracking performance based on physics models:
   i. Consistency of the object localization considering the its own dynamics.
6. Semantic completeness:
   i. How complete the system detects the object in a full-view (e.g. When a person is detected, are all parts detected correctly?)
7. Image quality (peak signal-to-noise ratio (PSNR) or entropy):
   i. PSNR value or image entropy value.
8. Partial occlusion rate:
   i. A ratio of the occluded area over the entire object area.
9. Localization and tracking performance
   i. While an object is shown in the video sequence, the consistency of localization and recognizing as the same object.
10. Contrast of the detected boxes:
    i. Image contrast value of the detected object boxes.
11. Entropy of the detected boxes:
    i. Image entropy value of the detected object boxes.
12. Recognition Identification consistency:
    i. While an object is shown in the video sequence, the consistency of detecting the correct type of the object.

Thus, the system receives the perception data and, based on the corresponding module, generates one or more probes as referenced above.

Figure 5:
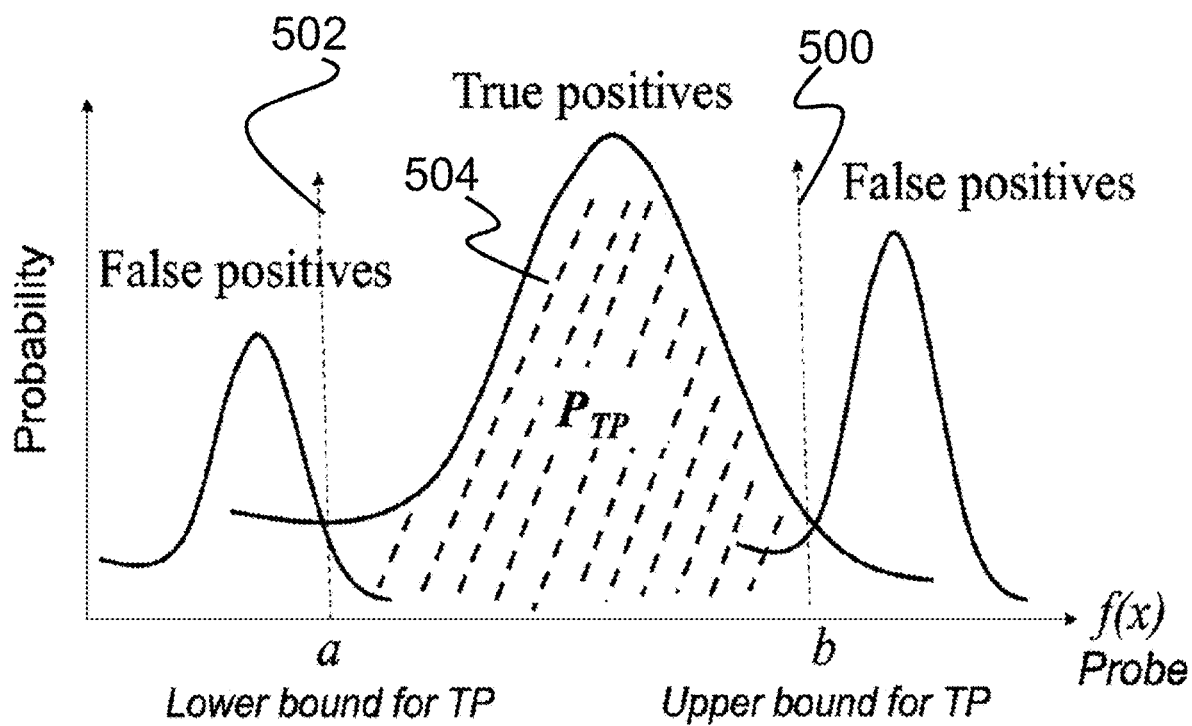
FIG. 5 is a chart depicting a sample probability distribution of a probe according to various aspects of the present invention.

(5.3) Error Evaluation Using Axiom Constraints Based on the Probabilistic Signal Temporal Logic The previous probe generation step results in multiple probes, such as detected object sizes, aspect ratios, recognition ID consistency, tracking deviations, and so on. From the true positive detections or recognitions, the system can perform statistical analysis for each probe. FIG. 5 shows a descriptive example of a probe. For a detection/recognition, x, let's assume that a probe, f(x), is generated. By analyzing the values from true positives and also those from false positives, the system can obtain probabilistic distributions of true positives and false positives as shown in FIG. 5. From the intersections between two different distribution graphs, the process sets up the upper 500 and the lower 502 bounds for true positives. The shaded area 504 presents the confidence probability, $P_{TP}$, of the probe. If this relation is described in a mathematical form (axiom) with the probabilistic signal temporal logic, it becomes as follows:

$$\forall x, Pr(a \leq f(x, t_s:t_e) \leq b \rightarrow y) \geq P_{TP},$$

where $Pr(\bullet)$ is the predicate and y is the true detection or recognition. As such, $t_s:t_e$ means the time sequence between $t_s$ and $t_e$, so $f(x, t_s:t_e)$ is the probe sequence in the time frame of $t_s:t_e$, and where a and b denote the lower bound and the upper bound, respectively, of f( ) for statistical true positive distributions, and $\forall x$ means for every detection/recognition x.

Depending on the probe dimensions, the probabilistic function can also be multi-dimensional. By integrating all the available axioms from x, the system obtains a "multi-dimensional range" of the corresponding detection or recognition. When the probabilistic signal temporal logic is violated with more than a certain threshold, the corresponding perception process is designated as erroneous. Examples of such threshold parameters include, the size of the aspect ratio of the object beyond a predefined probabilistic range, the ground object is above the surface more than a given allowance, and so on.

(5.4) Perception Error Correction Using the PSTL-Constraint-Based Optimization Detecting perception errors is not sufficient to recover the perception quality in the following image sequences. Therefore, it is desirable to adjust perception modules to have more accurate and robust detections and recognitions with that knowledge. Thus, the system implements a new optimization technique using the PSTL-constraint-based optimization.

In order to set up the optimization problem, 'perception dynamics,' are constructed as follows:

$$x_{t'} = f_t(x_t) + g_t(u_t),$$

where $x_t$ is the probe state at time t and $x_{t'}$ is the predicted probe in the next time frame, t'. $f_t(\bullet)$ is the state transition function and $g_t(\bullet)$ is the input function with the control input, $u_t$. In one aspect, control input, $u_t$ is ultimately what is adjusted on the intake device (e.g., such as tuning a field of view of a camera, altering a direction of the camera, etc.). A goal is to achieve the optimal $u_t$ to reduce perception errors (e.g., by adjusting the intake device or perception module). In order to meet the goal, the optimization problem is set to:

$$u_{OPT} = \arg\min_{u_t} J(x_t, u_t),$$

where $J(\bullet)$ is the cost function of estimating perception errors. Therefore, minimizing $J(\bullet)$ can achieve the optimal perception module control input. Eventually, the final optimization formula with the two or more PSTL-based constraints for probes, $f(x_t)$, $g(z_t)$, etc., becomes, $$u_{OPT} = \operatorname*{argmin}_{u_t} J(x_t, z_t, u_t)$$

$$\text{s.t. } \forall x_t, Pr(a \leq f(x_t, t_s:t_e) \leq b \rightarrow y) \geq P_{TPx}$$

$$\forall z_t, Pr(g(z_t, t_s:t_e) \leq c \rightarrow w) \geq P_{TPz}$$

where w denotes correct labeling for state z, y denotes correct labeling for state x, and $z_t$ denotes is another signal state at time t.

(5.5) Reduction to Practice

Figure 6A:
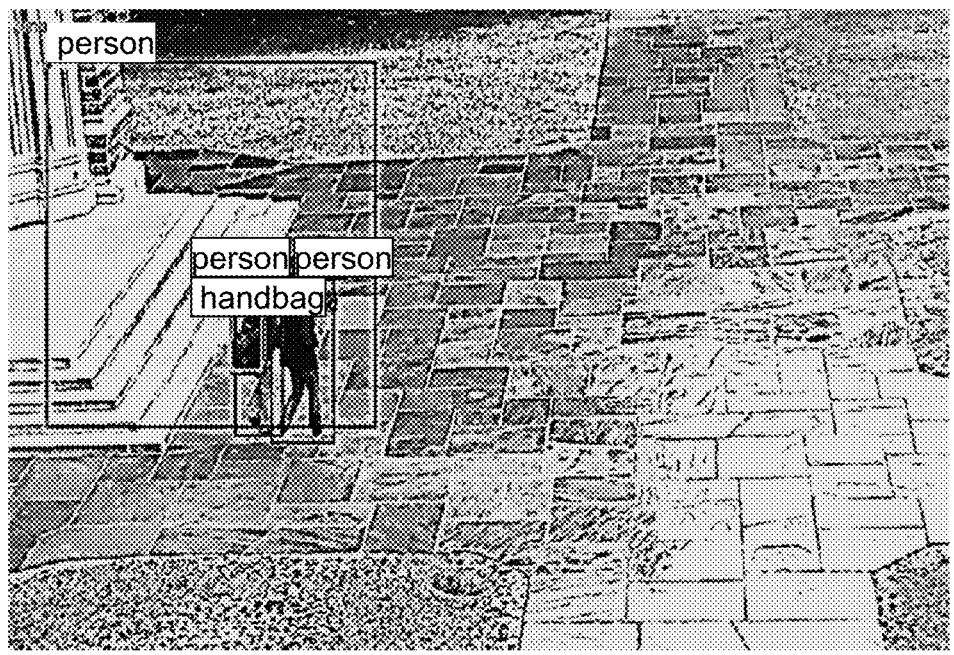
FIG. 6A is an illustration depicting misclassification using object detection, showing person detection from some background parts.
Figure 6B:
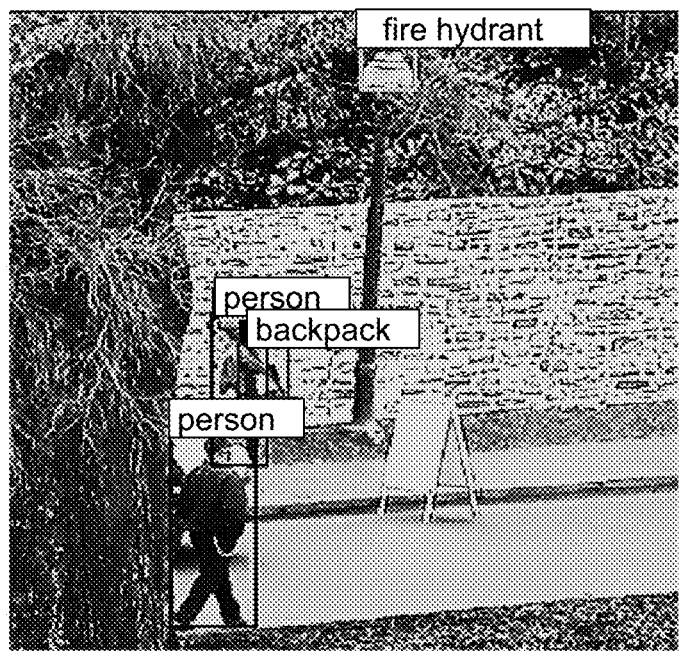
FIG. 6B is an illustration depicting misclassification using object detection, showing a fire hydrant detection from a lamp.
Figure 7:
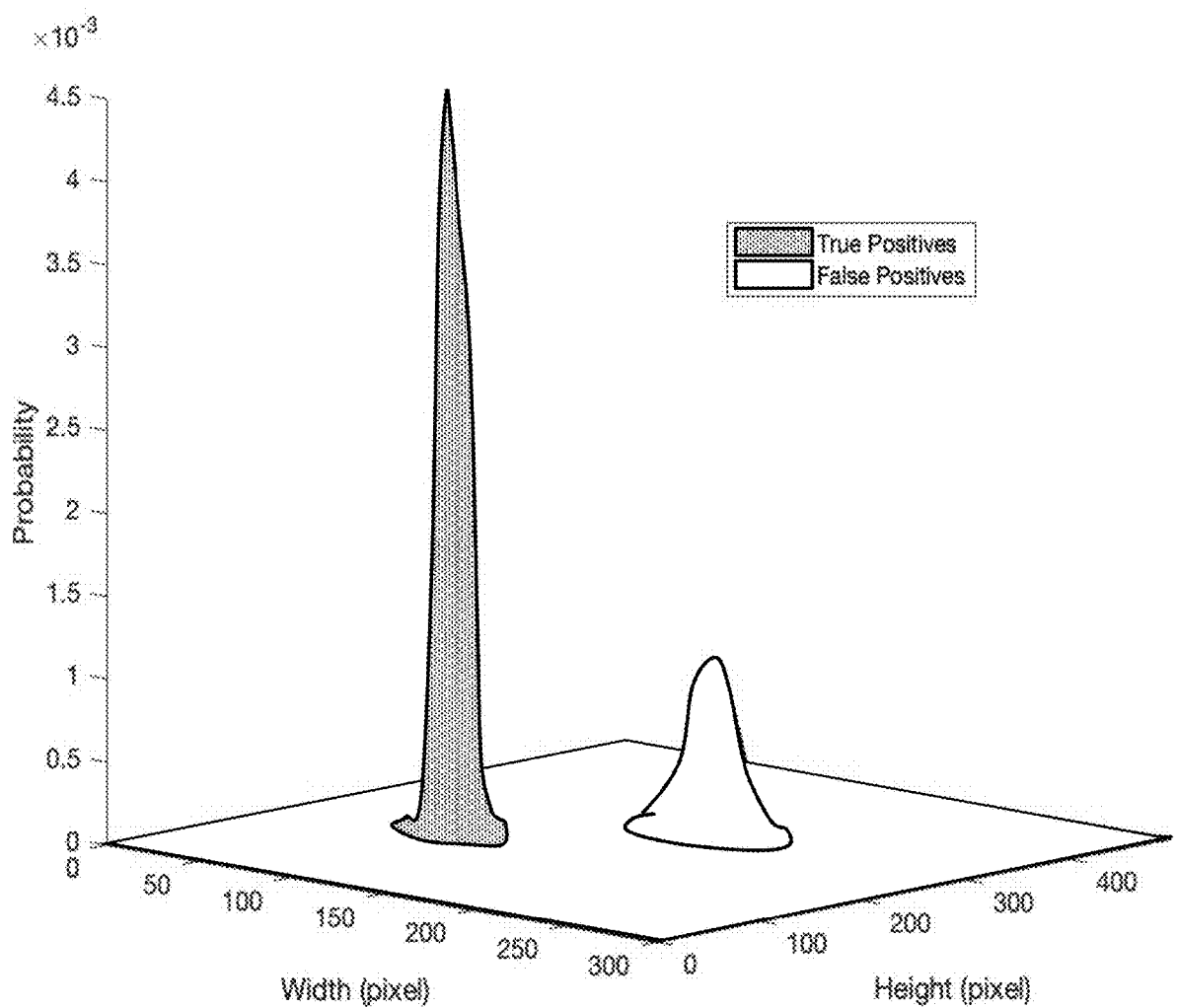
FIG. 7 is graph depicting true positive and false positive distributions with person width/height in the image plane.

Provided below are simple test results demonstrating an example reduction to practice of the system described herein. The sample test was directed to controlling the recognition confidence thresholding parameter for removing outliers shown in FIGS. 6A and 6B. For FIG. 6A, consider the acceptable size of a person in the image plane, and for FIG. 6B, consider the fire hydrant's acceptable distance from the ground plane. For the person size, the two statistical distributions for true positive detections and false positive detections are derived and depicted in FIG. 7.

With this statistical approach (assuming Gaussian distributions), the following PSTL-based axioms were set up for the person size:

$$\forall x, Pr(60 \leq f(x,t_s:t_e) \leq 100 \rightarrow \text{Person}_{WIDTH}) \geq 0.98$$

$$\forall y, Pr(120 \leq f(y,t_s:t_e) \leq 180 \rightarrow \text{Person}_{HEIGHT}) \geq 0.98$$

And with the same approach, an additional PSTL-based axiom was set up for the distance from the ground plane:

$$\forall z, Pr(g(z,t_s:t_e) \leq 1.0 \rightarrow \text{FireHydrant}) \geq 0.99$$

Figure 8:
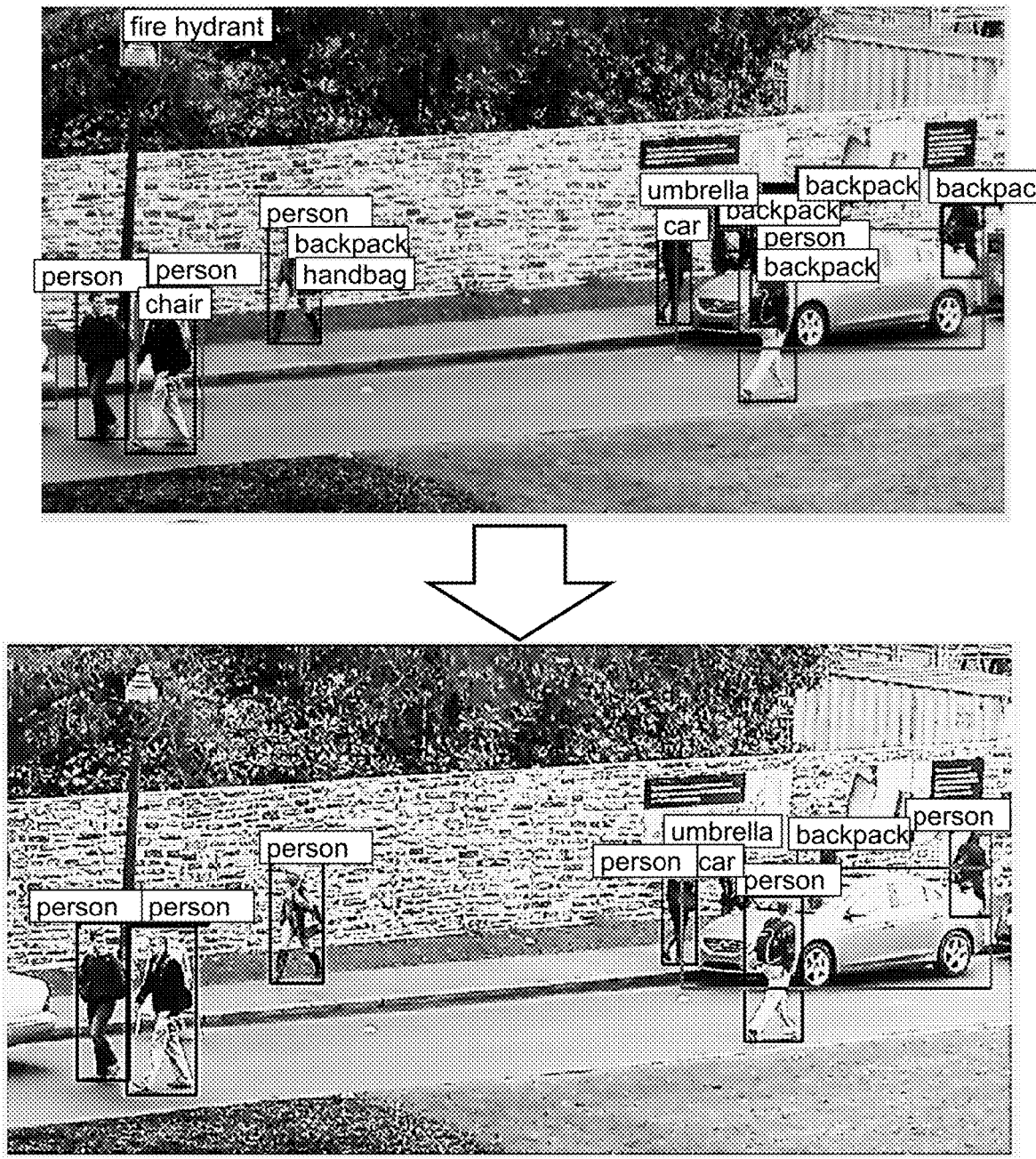
FIG. 8 is an illustration depicting an improvement in object recognition by removing the wrong fire hydrant detection.

All the above axioms will be the constraints, and the optimization problem for controlling the detection confidence threshold, $u_t$, is set to:

$$u_{OPT} = \underset{u_t}{\text{argmin}} \left\| u_t - \frac{(N_{TP} + N_{FP})}{N_{TP}} u_{NOW} \right\|$$

where $u_{NOW}$ is the current detection confidence threshold, $N_{TP}$ is the number of true positive detections (according to the axiom-based error detection), and $N_{FP}$ is the number of false positive detections. FIG. 8 illustrates improvements that can be gained through solving optimization problem to remove the wrong fire hydrant detection. In this optimization problem, the process finds the best $u_t$ from all candidates given $u_{NOW}$. Thus, $u_{OPT}$ will be a new detection confidence threshold instead of $u_{NOW}$ to reduce perception errors.

(5.6) Control of a Device

Figure 9:
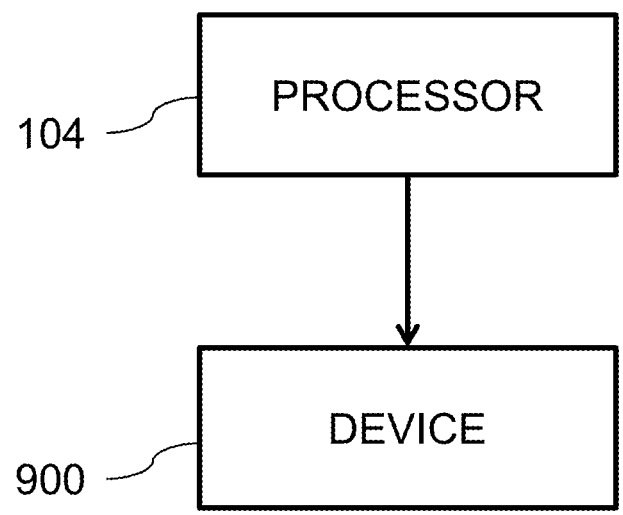
FIG. 9 is a block diagram depicting control of a device according to various embodiments.

As shown in FIG. 9, a processor 104 may be used to control a device 900 (e.g., a perception module that captures perception data) based on solving the optimization problem. The control of the device 900 may be used to modify the parameters that are used in controlling a perception module. In other embodiments, the device 900 may be controlled to cause the perception module device to move or otherwise initiate a physical action, such as changing directions or field-of-view. For example, actuators or motors are activated to cause the camera (or sensor) to move or zoom in or change a field-of-view.

The invention described herein supports computer vision and machine learning. For instance, in the field of vehicle manufacturing, lack of labeled data is a big bottleneck for data-driven approaches. With the PTSL object recognition system described herein, which uses only a few labels, classification is performed much quicker and more accurately. Furthermore, object detection and recognition process can facilitate autonomous cars with human instructions (e.g., construction worker, traffic officer). Based on the classification of the an object, such as a pedestrian or stop sign, etc., the system described herein causes a vehicle/driving maneuver to be performed by the autonomous vehicle that corresponds to the class label identified by the system. For example, if the object is a construction worker or traffic officer holding up a hand to indicate "stop", the system can cause the autonomous vehicle to apply a functional response, such as a braking operation implemented by a braking mechanism within the vehicle, in order to bring the autonomous vehicle to a stop. Likewise, if the system recognizes a pedestrian running or walking in front of the vehicle, the system can cause the vehicle to stop to avoid hitting the pedestrian. Other appropriate vehicle maneuver responses may include one or more of a steering operation, a throttle operation to increase speed or to decrease speed, or a decision to maintain course and speed without change. The vehicle responses may be appropriate for avoiding a collision or altering travel speed. In one embodiment, if the system detects an object in its path (e.g., a pedestrian, another vehicle), an alert is sent to the vehicle operating system to cause the vehicle to perform a braking operation. Alternatively, the alert may signal that the vehicle operating system should perform a swerving motion around the object, involving steering and accelerating operations or any other operations as required to provide for collision avoidance. As can be appreciated by those skilled in the art, other applications may also be applicable, such as those described in U.S. Provisional Application No. 62/984,713, filed on Mar. 3, 2020, the entirety of which is incorporated herein by reference as though fully set forth herein.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system to evaluate and reduce perception error in object detection and recognition, the system comprising:
   one or more processors and a memory, the memory being a non-transitory computer-readable medium having executable instructions encoded thereon, such that upon execution of the instructions, the one or more processors perform operations of:
   receiving, with a perception module, perception data from an environment, the perception data reflecting one or more objects in the environment;
   generating perception probes from the perception data, the perception probes describing one or more characteristics of the one or more objects;
   converting the perception probes into probabilistic signal temporal logic (PSTL)-based constraints, the PSTL-based constraints providing axioms having statistical analysis of one or more perception probes;
   evaluating the axioms to classify the perception probes as valid or erroneous, wherein in evaluating the axioms to classify the perception probes as valid or erroneous, the axioms provide statistical separation between true positive and false positive distributions;

generating optimal perception parameters by solving an optimization problem based on the axioms; and adjusting the perception module based on the optimal perception parameters.

2. The system as set forth in claim 1, wherein adjusting the perception module includes causing a camera to initiate a physical action selected from a group consisting of changing a directional focus or altering a field-of-view.

3. The system as set forth in claim 1, wherein generating perception probes from the perception data includes detecting the one or more objects in the perception data, tracking the one or more objects, and recognizing an action of the one or more objects.

4. The system as set forth in claim 1, wherein in converting the perception probes into probabilistic signal temporal logic (PSTL)-based constraints, a probabilistic signal temporal logic for a probe f(x) is generated as follows:

$$\forall x, Pr(a \leq f(x, t_s:t_e) \leq b \rightarrow y) \geq P_{TP},$$

where Pr(•) is a predicate and y is a true detection or recognition, where $P_{TP}$ denotes confidence probability of the probe, and where $t_s:t_e$ denotes a time sequence between $t_s$ and $t_e$, such that f(x, $t_s:t_e$) is a probe sequence in time frame of $t_s:t_e$, and where a and b denote lower bound and the upper bound, respectively, of f( ) for statistical true positive distributions, and $\forall x$ means for every detection/recognition x.

5. The system as set forth in claim 4, wherein the perception probes are classified as erroneous when the confidence probability is outside of the lower bound or upper bound.

6. The system as set forth in claim 1, wherein generating optimal perception parameters is determined by identifying an optimal control input $u_{OPT}$ that minimizes perception errors.

7. A computer program product for evaluating and reducing perception error in object detection and recognition, the computer program product comprising:

a non-transitory computer-readable medium having executable instructions encoded thereon, such that upon execution of the instructions by one or more processors, the one or more processors perform operations of:

receiving, with a perception module, perception data from an environment, the perception data reflecting one or more objects in the environment;

generating perception probes from the perception data, the perception probes describing one or more characteristics of the one or more objects;

converting the perception probes into probabilistic signal temporal logic (PSTL)-based constraints, the PSTL-based constraints providing axioms having statistical analysis of one or more perception probes;

evaluating the axioms to classify the perception probes as valid or erroneous, wherein in evaluating the axioms to classify the perception probes as valid or erroneous, the axioms provide statistical separation between true positive and false positive distributions;

generating optimal perception parameters by solving an optimization problem based on the axioms; and adjusting the perception module based on the optimal perception parameters.

8. The computer program product as set forth in claim 7, wherein adjusting the perception module includes causing a camera to initiate a physical action selected from a group consisting of changing a directional focus or altering a field-of-view.

9. The computer program product as set forth in claim 7, wherein generating perception probes from the perception data includes detecting the one or more objects in the perception data, tracking the one or more objects, and recognizing an action of the one or more objects.

10. The computer program product as set forth in claim 7, wherein in converting the perception probes into probabilistic signal temporal logic (PTSTL)-based constraints, a probabilistic signal temporal logic for a probe f(x) is generated as follows:

$$\forall x, Pr(a \leq f(x, t_s:t_e) \leq b \rightarrow y) \geq P_{TP},$$

where Pr(•) is a predicate and y is a true detection or recognition, where $P_{TP}$ denotes confidence probability of the probe, and where $t_s:t_e$ denotes a time sequence between $t_s$ and $t_e$, such that f(x, $t_s:t_e$) is a probe sequence in time frame of $t_s:t_e$, and where a and b denote lower bound and the upper bound, respectively, of f( ) for statistical true positive distributions, and $\forall x$ means for every detection/recognition x.

11. The computer program product as set forth in claim 10, wherein the perception probes are classified as erroneous when the confidence probability is outside of the lower bound or upper bound.

12. The computer program product as set forth in claim 7, wherein generating optimal perception parameters is determined by identifying an optimal control input $u_{OPT}$ that minimizes perception errors.

13. A computer implemented method for evaluating and reducing perception error in object detection and recognition the method comprising an act of:

causing one or more processors to execute instructions encoded on a non-transitory computer-readable medium, such that upon execution, the one or more processors perform operations of:

receiving, with a perception module, perception data from an environment, the perception data reflecting one or more objects in the environment;

generating perception probes from the perception data, the perception probes describing one or more characteristics of the one or more objects;

converting the perception probes into probabilistic signal temporal logic (PSTL)-based constraints, the PSTL-based constraints providing axioms having statistical analysis of one or more perception probes;

evaluating the axioms to classify the perception probes as valid or erroneous, wherein in evaluating the axioms to classify the perception probes as valid or erroneous, the axioms provide statistical separation between true positive and false positive distributions;

generating optimal perception parameters by solving an optimization problem based on the axioms; and adjusting the perception module based on the optimal perception parameters.

14. The method as set forth in claim 13, wherein adjusting the perception module includes causing a camera to initiate a physical action selected from a group consisting of changing a directional focus or altering a field-of-view.

15. The method as set forth in claim 13, wherein generating perception probes from the perception data includes detecting the one or more objects in the perception data, tracking the one or more objects, and recognizing an action of the one or more objects.

16. The method as set forth in claim 13, wherein in converting the perception probes into probabilistic signal temporal logic (PSTL)-based constraints, a probabilistic signal temporal logic for a probe f(x) is generated as follows:

$$\forall x, Pr(a \leq f(x, t_s:t_e) \leq b \rightarrow y) \geq P_{TP},$$

where Pr(•) is a predicate and y is a true detection or recognition, where $P_{TP}$ denotes confidence probability of the probe, and where $t_s:t_e$ denotes a time sequence between $t_s$ and $t_e$, such that $f(x, t_s:t_e)$ is a probe sequence in time frame of $t_s:t_e$, and where a and b denote lower bound and the upper bound, respectively, of f( ) for statistical true positive distributions, and $\forall x$ means for every detection/recognition x.

17. The method as set forth in claim 16, wherein the perception probes are classified as erroneous when the confidence probability is outside of the lower bound or upper bound.

18. The method as set forth in claim 13, wherein generating optimal perception parameters is determined by identifying an optimal control input $u_{OPT}$ that minimizes perception errors.

\* \* \* \* \*